(12) United States Patent
Shroff et al.

(10) Patent No.: US 11,580,226 B2
(45) Date of Patent: Feb. 14, 2023

(54) HYBRID FIRMWARE CODE PROTECTION

(71) Applicant: Cisco Technology, Inc., San Jose, CA (US)

(72) Inventors: Chirag Kiritkumar Shroff, Cary, NC (US); Dylan Thomas Walker, Austin, TX (US); Gregory Michael Schnorr, Gilroy, CA (US); Gregory James Waldschmidt, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1011 days.

(21) Appl. No.: 16/281,527

(22) Filed: Feb. 21, 2019

(65) Prior Publication Data
US 2020/0272738 A1     Aug. 27, 2020

(51) Int. Cl.
*G06F 21/57* (2013.01)
*G06F 8/65* (2018.01)
*G06F 12/14* (2006.01)
*G06F 13/42* (2006.01)
*G06F 11/14* (2006.01)
*G06F 21/52* (2013.01)

(52) U.S. Cl.
CPC .............. *G06F 21/572* (2013.01); *G06F 8/65* (2013.01); *G06F 11/1433* (2013.01); *G06F 11/1469* (2013.01); *G06F 12/1441* (2013.01); *G06F 13/4282* (2013.01); *G06F 21/52* (2013.01); *G06F 21/575* (2013.01)

(58) Field of Classification Search
CPC ...... G06F 21/572; G06F 8/65; G06F 11/1433; G06F 11/1469; G06F 12/1441; G06F 13/4282; G06F 21/52; G06F 21/575; G06F 2201/815; G06F 11/004; G06F 11/1417
See application file for complete search history.

(56) References Cited

U.S. PATENT DOCUMENTS

| 7,337,309 B2 | 2/2008 | Nguyen et al. |
| 2004/0076043 A1 | 4/2004 | Boals et al. |
| 2010/0077199 A1 | 3/2010 | Hobson et al. |

(Continued)

OTHER PUBLICATIONS

N. Nikolov, "Research Firmware Update Over the Air from the Cloud," 2018 IEEE XXVII International Scientific Conference Electronics—ET, 2018, pp. 1-4, doi: 10.1109/ET.2018.8549628. (Year: 2018).*

(Continued)

*Primary Examiner* — Theodore C Parsons
(74) *Attorney, Agent, or Firm* — Edell, Shapiro & Finnan, LLC

(57) ABSTRACT

A firmware protection module implements a hybrid firmware protection scheme on a computing device. The firmware protection module intercepts a message from a processor to a memory of the computing device. The message includes a command and an address in the memory corresponding to a firmware module stored in the module. The firmware protection module determines whether the command in the message is prohibited and whether the address in the message is protected. Responsive to a determination that the command is prohibited and the address is protected, the firmware protection module prevents at least a portion of the message from reaching the memory.

20 Claims, 5 Drawing Sheets

(56) References Cited

U.S. PATENT DOCUMENTS

| | | | |
|---|---|---|---|
| 2010/0241838 A1* | 9/2010 | Cohen | G06F 11/1004 |
| | | | 714/E11.131 |
| 2011/0131447 A1 | 6/2011 | Prakash et al. | |
| 2013/0031538 A1 | 1/2013 | Skalsky | |
| 2014/0317318 A1* | 10/2014 | Wojcik | G06F 8/71 |
| | | | 710/8 |
| 2016/0179500 A1 | 6/2016 | Hsieh et al. | |
| 2016/0246585 A1* | 8/2016 | Li | G06F 8/654 |
| 2017/0286086 A1* | 10/2017 | Narasimhan | G06F 11/1469 |
| 2018/0239727 A1 | 8/2018 | Hershman et al. | |
| 2019/0042228 A1* | 2/2019 | Nolan | G06F 8/64 |
| 2019/0377564 A1* | 12/2019 | Poenaru | G06F 3/0673 |

OTHER PUBLICATIONS

International Search Report and Written Opinion in counterpad International Application No. PCT/US2020/018270, dated Jun. 5, 2020, 11 pages.

Andrew Regenscheid, National Institute of Standards and Technology, "Platform Firmware Resiliency Guidelines", NIST Special Publication 800-193, https://doi.org/10.6028/NIST.SP.800-193, May 2018, 45 pages.

\* cited by examiner

HYBRID FIRMWARE CODE PROTECTION

TECHNICAL FIELD

The present disclosure relates to secure deployment of firmware code modules for computing devices.

BACKGROUND

Computing devices typically store one or more copies of firmware in non-volatile memory to initialize hardware after powering on the device. For instance, a computing device may store Basic Input/Output System (BIOS) firmware in a boot flash memory to enable the processor to boot an operating system for the computer. In some instances, a computing device may store more than one version of the firmware to provide a backup copy of firmware to prevent the operating system from inadvertently corrupting the BIOS firmware. A maliciously compromised operating system may directly overwrite the boot flash memory, wiping out all versions of the firmware, and rendering the computing device useless.

BIOS firmware may be secured against compromised operating systems by implementing a secure BIOS update process. In a typical BIOS update process the operating system writes an update package to computer readable media other than the boot flash, and, on the next reset of the computing device, the BIOS fetches the update package, verifies the update package is authentic, and installs the package. The operating system is otherwise prevented from accessing the BIOS region in the boot flash, for example, with protected range registers provided by the processor architecture.

DESCRIPTION OF EXAMPLE EMBODIMENTS

Overview

The techniques presented herein provide for a computing-device-implemented method for a hybrid firmware protection scheme. The method comprises intercepting a message from a processor to a memory. The memory includes a command and an address in the memory corresponding to a firmware module stored in the module. The method further includes determining whether the command in the message is prohibited and determining whether the address in the message is protected. Responsive to a determination that the command is prohibited and the address is protected, the method further includes preventing at least a portion of the message from reaching the memory.

Example Embodiments

The typical secure update of BIOS firmware requires extended downtime during the power cycle to allow the BIOS to load, fetch the update package, verify the package, install the update, and then reload the updated BIOS. Running the update process while the operating system is not running secures the update process, but may lengthen the downtime of the computing device by an unacceptable amount. The techniques presented herein mitigate the boot time impact of updating firmware modules that are loaded at boot time by implementing a hybrid scheme in which the operating system directly updates the primary firmware (e.g., the BIOS module used to boot the operating system), while maintaining a backup version of the firmware that is updated indirectly (e.g., via the secure update package).

Figure 1:
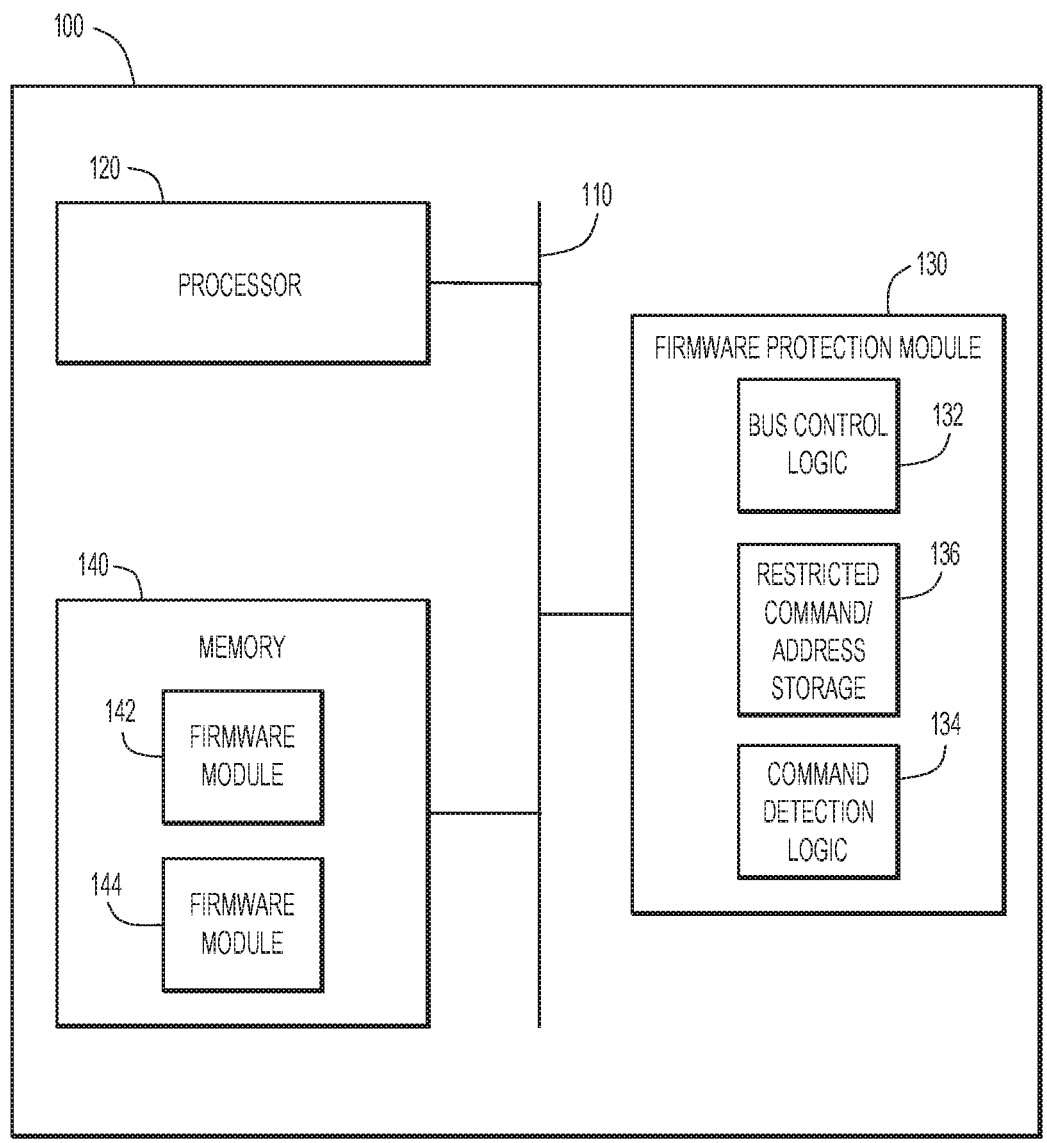
FIG. 1 is a simplified block diagram of a computing device with hybrid firmware protection, according to an example embodiment.

Referring now to FIG. 1, a simplified block diagram of a computing device 100 configured to implement the hybrid firmware protection scheme is shown. The computing device includes a communications bus 110 that couples a processor 120 to a firmware protection module 130, and a firmware memory 140. The processor 120 may include one or more processing units that are configured to load firmware (e.g., BIOS firmware) from the memory 140. The memory 140 may include read only memory (ROM), random access memory (RAM), magnetic disk storage media devices, optical storage media devices, flash memory devices, electrical, optical, or other physical/tangible memory storage devices. Thus, in general, the memory 140 may include one or more tangible (non-transitory) computer readable storage media (e.g., a memory device) encoded with firmware comprising computer executable instructions and when the firmware is executed (by the processor 120) it is able to perform the operations described herein.

The firmware protection module 130 includes bus control logic 132 configured to drive communications over the bus 110. The firmware protection module 130 also includes a command detection logic 134 configured to detect commands on the bus 110 and a restricted command/address storage 136 configured to store commands and memory addresses that are protected. The memory 140 stores firmware modules 142 and 144, which may include instructions to enable the processor 120 to boot some version of an operating system.

In one example, the bus control logic 132 reads the bus 110 until the command detection logic 134 detects a message with a command and an indicator to a memory address that is noted as protected in the storage 136. Once the command detection logic 134 detects a restricted command, the bus control logic 132 interrupts the command on the bus 110, such that the restricted command does not reach the memory 140.

In another example, the firmware module 142 may be a primary version of the firmware, which may be loaded during normal operations, and the firmware module 144 may be a backup version of the firmware. The primary firmware module 142 may be updated by the operating system while the operating system is running, but the backup firmware module 144 is stored at a protected address, and the operating system does not have the capability to access the backup firmware module 144. For instance, the backup firmware module 144 may be write restricted to prevent overwriting all BIOS firmware in the computing device 100. In this instance, the firmware protection module 130 prevents any prohibited write operations from being received by the protected address of the backup firmware module 144.

In a further example, the firmware protection module 130 may implement a read restriction by allowing a restricted read command to reach the memory 140 at a protected address, but the returning data may be intercepted and prevented from reaching the source of the read command. For instance, the firmware protection module may prevent an operation system from reading secret key information that is only available to the bootloader.

Figure 2:
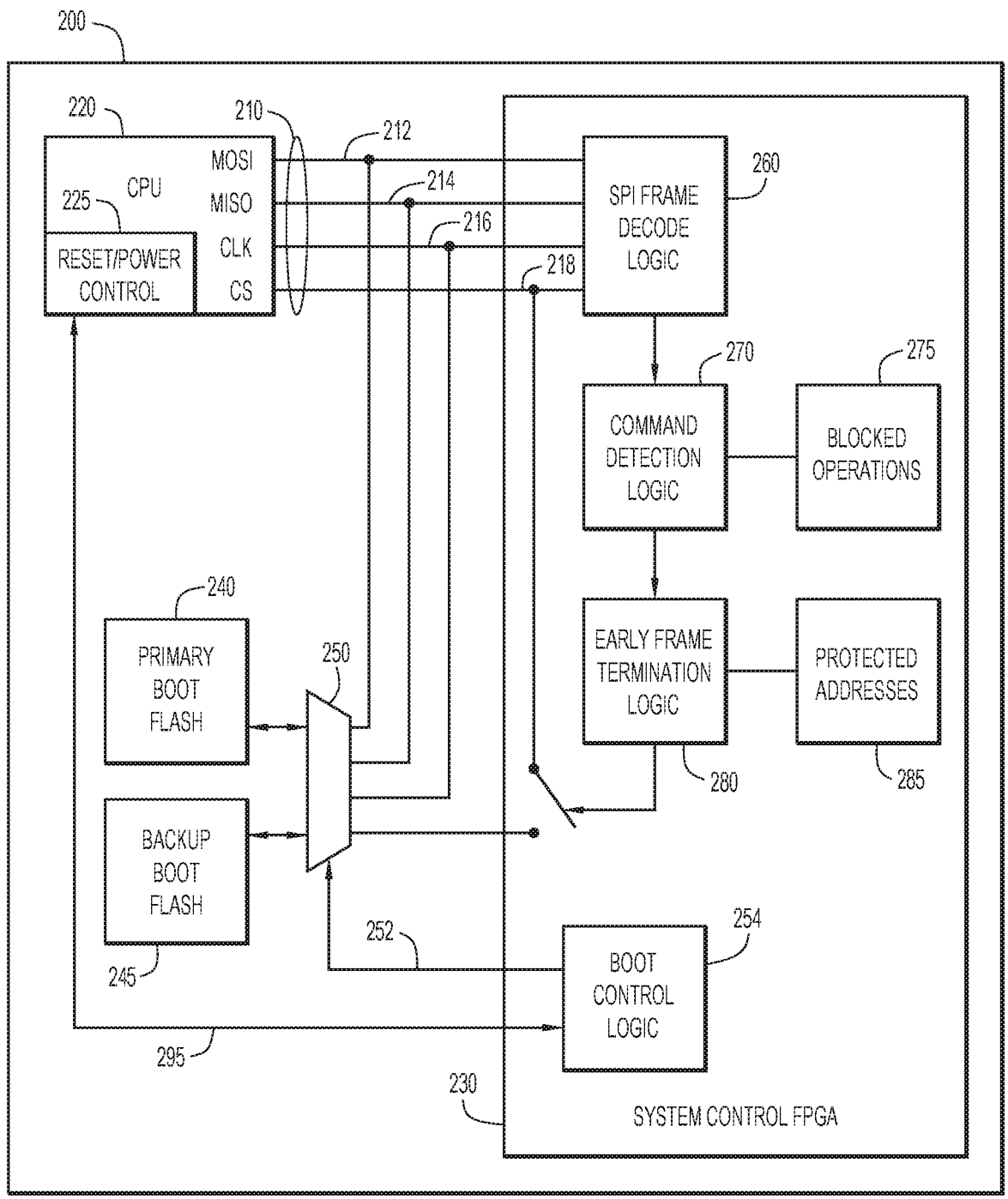
FIG. 2 is a simplified block diagram of a computing device with hybrid boot code protection, according to an example embodiment.

Referring now to FIG. 2, a simplified block diagram of a computing device 200 configured to implement a hybrid BIOS protection scheme is shown. The computing device 200 includes a Serial Peripheral Interface (SPI) bus 210 comprising a Master Output/Slave Input (MOSI) line 212, a Master Input/Slave Output (MISO) line 214, a clock line 216, and a Chip Select (CS) line 218. The SPI bus 210 is coupled to a Central Processor Unit (CPU) 220 comprising one or more processors configured to execute computer readable instructions. The CPU 220 includes a reset/power control module 225 configured to control the power cycle of the computing device 200.

The SPI bus 210 is also coupled to a system control Field Programming Gate Array (FPGA) 230 that is configured to implement the hybrid BIOS protection scheme described herein. The SPI bus 210 is coupled to a primary boot flash memory 240 and a backup boot flash memory 245 through a multiplexer 250. The multiplexer 250 is controlled by the system control FPGA 230 through a signal line 252. The system control FPGA 230 includes boot control logic 254 configured to select which boot flash the multiplexer 250 connects to the SPI bus 210. In other words, the boot control logic 254 in the system control FPGA 230 can control which version of the boot flash is connected to the CPU 220 by directing the multiplexer 250 to connect either the primary boot flash memory 240 or the backup boot flash memory 245 to the SPI bus 210.

The system control FPGA 230 includes SPI frame decode logic 260 configured to read and decode SPI frames on the SPI bus 210. The SPI frames may include a command and an indicator of a selected memory for the multiplexer 250. The SPI frame decode logic 260 passes the decoded SPI frames from the SPI bus 210 to a command detection logic 270, which compares detected commands to a set of blocked operations 275 to determine if the detected command may be prohibited. If the command detected by the command detection logic 270 is a blocked operation, the early frame termination logic 280 determines if the blocked command is directed to a protected address 285. If a blocked operation 275 is directed to a protected address 285, then the early frame termination logic 280 interrupts the CS line 218 of the SPI bus 210, which prevents the remainder of the SPI frame from reaching the boot flash. Alternatively, the FPGA 230 may control the entire SPI bus 210, allowing the FPGA to intercept the entire SPI frame before the frame reaches the multiplexer 250.

The FPGA 230 monitors the clock, data, primary/backup select logic of the SPI bus 210 to be able to override the SPI CS line 218. In one example, the FPGA 230 essentially commandeers the SPI CS multiplexer 250, prohibiting the operating system from changing the CS line 218 to CS0, i.e., the address of the backup boot flash 245. Alternatively, the FPGA 230 may control the entire SPI bus 210 and intercept the entire message. During normal operation, the computing device 200 boots the BIOS stored in the primary boot flash memory 240 and SPI CS1 (i.e., the address of the primary boot flash memory 240) is active on the multiplexer 250. The operating system can directly write to the primary boot flash memory 240 unimpeded, which allows the BIOS to be updated without affecting the boot time. If a compromised operating system corrupts the BIOS stored in the primary boot flash memory 240, then the backup boot flash will be active on the next power cycle.

In another example, the FPGA 230 protects the firmware in the backup boot flash 245 based on a configuration provided by the firmware. The FPGA 230 may also include a status register to indicate that the firmware protection scheme is supported, as well as which Application Programming Interface (API) version is supported. Additionally, the FPGA 230 may include a number of flash address range protection registers, e.g., five registers to match the number and format of a typical SPI architecture. The FPGA 230 may store a list of restricted SPI flash opcodes, as well as a write-once lock bit to enable firmware protection. Further, the FPGA 230 may store the address of the last blocked address and a count of the number of blocked accesses.

In a further example, the primary boot flash memory 240 and the backup boot flash 245 may be implemented as different address ranges in a single memory device. In this example, the FPGA 230 no longer needs to monitor the CS line 218 to selectively enforce certain sectors for write protection. Alternatively, the primary boot flash memory 240 and backup boot flash 245 may be implemented in parallel flash memories, e.g., with address/data multiplexers. In this alternative, the FPGA 230 may work with a latched address to interrupt the CS line 218 from reaching the boot flash memories. If the FPGA 230 has visibility into all address lines of the parallel memories, the FPGA 230 may interrupt the SPI CS line 218 in time to prevent rogue access to certain regions of the parallel memories. In order to detect erase/program commands, the FPGA 230 may monitor cycles of the data bus.

Figure 3:
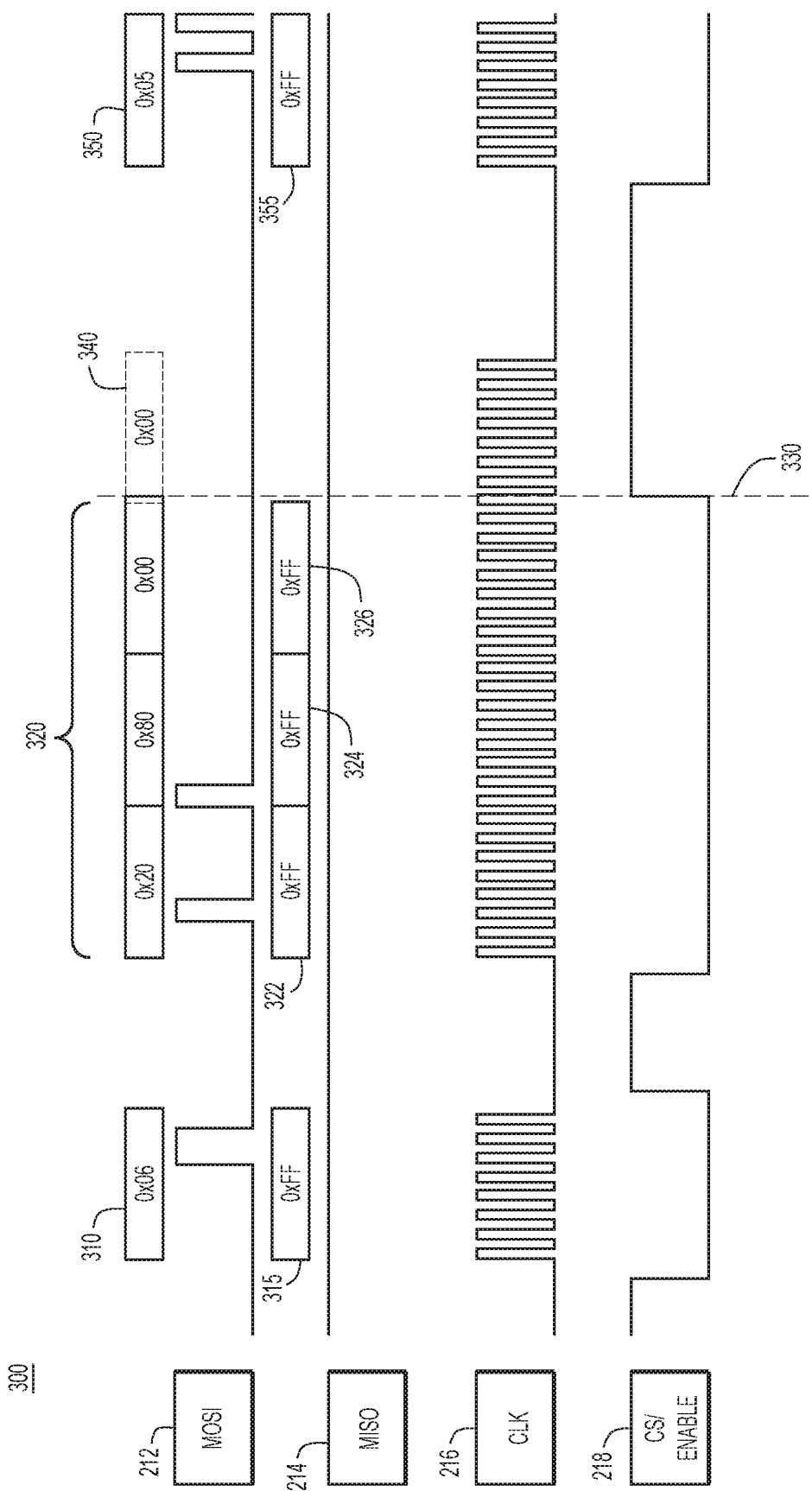
FIG. 3 is a timing diagram showing signals interrupting a prohibited code to a protected address in memory, according to an example embodiment.

Referring now to FIG. 3, with continued reference to elements from FIG. 2, a timing diagram 300 illustrates the signals on the SPI bus 210 when the system control FPGA 230 intercepts a prohibited operation to a protected address. The timing diagram 300 shows the four channels of the SPI bus 210: MOSI line 212 sending data from the processor to the memory device, MISO line 214 sending data from the memory device to the processor, the clock line (CLK) 216 synchronizing the data signals between the processor and the memory device, and the CS line 218 which is normally high, but pulled low to perform an enable function connecting the processor and the memory device. For simplicity, the multiplexer 250 is not considered in this example.

Initially, the CS line 218 is driven low to enable communication between the processor and the memory device, and the clock signal 216 begins. During the initial segment, the processor sends a command 310 on the MOSI line 212 and the memory device sends a blank signal on the MISO line 214. In one example, the command 310 may be a write command (e.g., opcode 0x06) that is prohibited for a certain range of addresses. In this example, the command 310 is followed by a three byte address 320 from the processor on the MOSI line 212, and the memory device continues to send blank signals 322, 324, and 326 on the MISO line 214. In one example, the address 320 (e.g., 0x208000) is a protected address.

Since the FPGA 230 is monitoring the SPI bus 210 for prohibited commands to protected addresses, the FPGA 230 interrupts the CS line 218 at 330, sending the CS line 218 high and disabling the connection between the processor and the memory device. This prevents the rest of the message (e.g., starting with byte 340) from reaching the memory device. The clock signal 216 continues until the bus master detects the fault (i.e., the clock signal 216 is running while the CS line 218 is high) and resets the bus 210. Subsequently, the processor may drive the CS line 218 low again and begin sending command 350 to the memory device and receiving blank signal 355 from the memory device.

Figure 4:
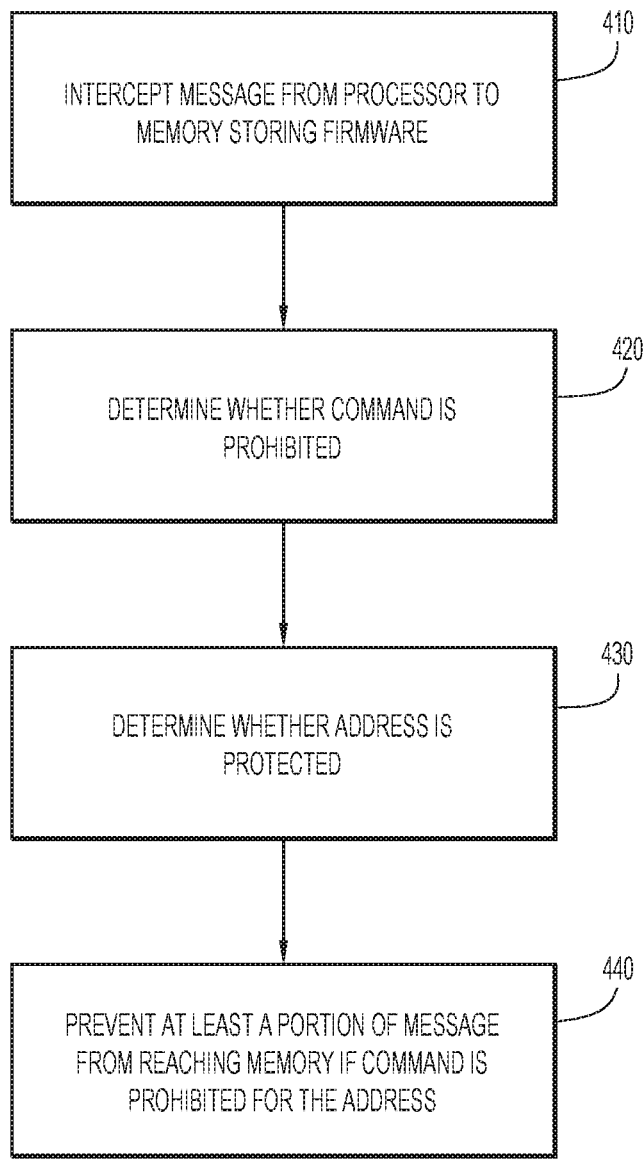
FIG. 4 is a flowchart illustrating operations of a computing device to implement hybrid firmware protection, according to an example embodiment.

Referring now to FIG. 4, a flowchart is shown depicting operations performed by a computing device (e.g., computing device 100) in a process 400 to provide firmware protection. At 410, a firmware protection module in the computing device intercepts a message from a processor to a memory. The message includes a command and an address corresponding to a firmware module stored in the memory. In one example, the address is an address of a sector in the memory device. Alternatively, the address may a selection of a particular memory device. At 420, the firmware protection module determines whether the command is prohibited. In one example, the firmware protection device may be programmed to detect write and/or erase commands as prohibited for certain addresses.

Figure 5:
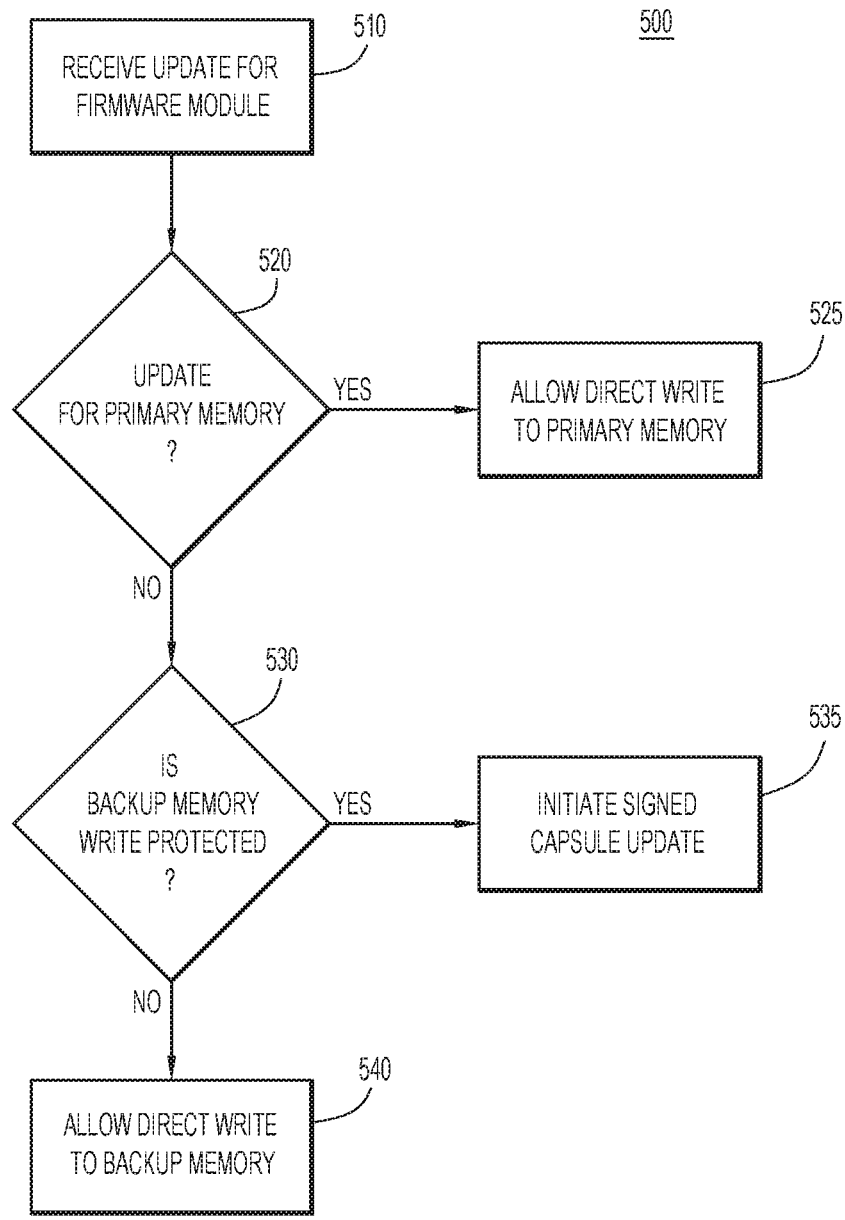
FIG. 5 illustrates a flowchart illustrating operations of a computing device to upgrade firmware through the hybrid firmware protection, according to an example embodiment.

At 430, the firmware protection module determines whether the address in the intercepted message is a protected address. In one example, the firmware protection module may be programmed with a range of addresses (e.g., corresponding to the location of a backup version of a firmware module) that are protected from write and erase commands. At 440, the firmware protection module prevents at least a portion of the message from reaching the memory, responsive to a determination that the command is prohibited and the address is protected. In one example, the firmware protection module may prevent the message from reaching the memory by interrupting an address line of the communications link (e.g., a SPI bus) between the processor and the memory device. Alternatively, the firmware protection module may interrupt the entire communications link, intercepting and preventing the entire message from reaching the memory Referring now to FIG. 5, a flowchart illustrates operations performed at a computing device to securely update a firmware module protected by the hybrid firmware protection scheme described herein. At 510, the computing device receives an update for a firmware module. In one example, the update may include an updated image of the firmware code modules. At 520, the computing device determines whether the update is directed toward a primary firmware module, and allows any updates that are directed to the primary firmware module at 525. In one example, the primary firmware module may enable the computing device to boot into an operating system in normal operation.

Having determined that the update is not directed to the primary firmware module, i.e., it is directed to a backup firmware module, the computing device determines whether the backup memory storing the backup firmware module is protected at 530. If the backup memory is write protected, then the computing device initiates a signed capsule update process at 535. In one example, the signed update process comprises rebooting with the backup firmware, fetching the update as a signed update capsule, verifying the signature of the capsule, installing the update in the capsule to the backup firmware memory, and rebooting the computing device. Alternatively, if the computing device determines that the backup memory is not write protected, then the computing device allows the update to be directly written into the backup firmware memory at 540. In one example, the backup firmware memory may be unprotected from write/erase commands if the backup firmware memory is a legacy memory device that does not support the capsule update process.

In summary, the hybrid firmware protection techniques described herein enable strict control of updates to a backup firmware module, without increasing boot time during updates to the primary firmware module. The backup firmware protection allows the backup firmware to be relatively infrequently updated to address extreme risks (e.g., Spectre/Meltdown exploits) while maintaining minimal impact for the relatively more frequent updates of the primary firmware under which a computing device typically operates. The techniques describe herein are processor agnostic, and do not rely on specific processor architecture features (e.g., x86 chipset protections) to provide firmware protection.

In particular examples, the hybrid firmware protection techniques described herein enable BIOS upgrades that provide the speed of direct BIOS updates while allowing the increased security of signed BIOS capsules. The use of inline logic (e.g., system control FPGA 230) with a flexible policy to implement protection of SPI flash devices in a processor agnostic manner provides firmware protection for a wide range of CPUs, Baseboard Management Controllers (BMCs), and/or Advanced Reduced Instruction Set Computing (RISC) Machine (ARM)-based System-on-Chip (SoC) devices.

In one form, a method is provided for a computing device to implement a hybrid firmware protection scheme. The method comprises intercepting a message from a processor to a memory. The message includes a command and an address in the memory corresponding to a firmware module stored in the module. The method further includes determining whether the command in the message is prohibited and determining whether the address in the message is protected. Responsive to a determination that the command is prohibited and the address is protected, the method further includes preventing at least a portion of the message from reaching the memory.

In one form, the preventing operation comprises interrupting an address line between the processor and the memory, so as to prevent the address corresponding to the firmware module from reaching the memory. The message may be an SPI frame, and the preventing at least a portion of the message from reaching the memory may comprise interrupting a SPI Chip Select line of a SPI bus between the processor and the memory.

The firmware module may include one or more code modules enabling the processor to boot an operating system. In this case, the method may further include: updating the firmware module to generate an updated firmware module; and rebooting the operating system from the updated firmware module. Furthermore, the method may further include: responsive to a determination that the updated firmware module corrupted the operating system, rebooting the operating system from a backup firmware module stored at a protected address in the memory.

In one form, the method may further comprising: storing a backup firmware module at a protected address in the memory; and upgrading the backup firmware module based on a validated upgrade capsule.

In another form, an apparatus comprising a memory, a processor, and a firmware protection module is provided. The memory is configured to store a plurality of firmware modules. The processor is configured to access one or more of the plurality of firmware modules by sending a message to the memory. The message comprises a command and an address in the memory corresponding to a firmware module of the plurality of firmware modules. The firmware protection module is configured to intercept the message from the processor to the memory, determine whether the command is prohibited, and determine whether the address is protected. Responsive to a determination that the command is prohibited and the address is protected, the firmware protection module is configured to prevent at least a portion of the message from reaching the memory.

The firmware protection module may be configured to prevent at least a portion of the message from reaching the memory by interrupting an address line between the processor and the memory, so as to prevent the address corresponding to the firmware module from reaching the memory.

The processor may be further configured to: store a backup firmware module at a protected address in the memory; and upgrade the backup firmware module based on a validated upgrade capsule. The processor may be further configured to boot an operating system from one or more code modules in the firmware module. Furthermore, the processor may be further configured to: update the firmware module to generate an updated firmware module; and reboot the operating system from the updated firmware module.

The processor may be further configured to, responsive to a determination that the updated firmware module corrupted the operating system, reboot the operating system from a backup firmware module stored at a protected address in the memory.

In yet another form, an apparatus comprising a first memory, a second memory, a processor, a communications bus, and a firmware protection module is provided. The first memory is configured to store a primary firmware module. The second memory is configured to store a backup firmware module. The processor is configured to selectively access the primary firmware module or the backup firmware module. The communications bus is configured to communicatively couple the processor to the first memory and the second memory. The firmware protection module is configured to intercept the message from the processor to the memory. The message comprises a command and an indicator of a selected memory. The firmware protection module is also configured to determine whether the command is prohibited at the selected memory. Responsive to a determination that the command is prohibited at the selected memory, the firmware protection module is configured to interrupt the indicator to prevent at least a portion of the message from reaching the selected memory.

The processor may be further configured to upgrade the backup firmware module based on a validated upgrade capsule. The processor may be configured to boot an operating system from the primary firmware module in the first memory.

The above description is intended by way of example only. In particular, the techniques described herein have been described with respect to particular protocols (e.g., SPI), but may be applied to any inter-component communication system (e.g., Inter-Integrated Circuit (I2C)) for a computing device.

What is claimed is:

1. A method comprising:
    storing a primary firmware module in a first range of addresses in a memory of a computing device;
    storing a backup firmware module in a second range of addresses in the memory of the computing device;
    booting an operating system on the computing device with the primary firmware module;
    intercepting a message from the operating system, the message including a command and an address in the memory;
    responsive to a determination that the address is within the second range of addresses and that the command is prohibited for the second range of addresses storing the backup firmware module, preventing at least a portion of the message from reaching the memory; and
    responsive to a determination that the address in the message is within the first range of addresses storing the primary firmware module, allowing the message to reach the memory while the computing device is running the operating system.

2. The method of claim 1, wherein preventing at least a portion of the message from reaching the memory comprises interrupting an address line between a processor and the memory, so as to prevent the address corresponding to the backup firmware module from reaching the memory.

3. The method of claim 1, wherein the message is a Serial Peripheral Interface (SPI) frame, and wherein preventing at least a portion of the message from reaching the memory comprises interrupting a SPI Chip Select line of a SPI bus.

4. The method of claim 1, further comprising:
    upgrading the backup firmware module based on a validated upgrade capsule.

5. The method of claim 1, wherein the primary firmware module includes one or more code modules enabling a processor to boot the operating system.

6. The method of claim 5, further comprising:
    updating the primary firmware module to generate an updated primary firmware module; and
    rebooting the operating system from the updated primary firmware module.

7. The method of claim 6, further comprising:
    responsive to a determination that the updated primary firmware module corrupted the operating system, rebooting the operating system from the backup firmware module.

8. An apparatus comprising:
    a memory configured to store a plurality of firmware modules, the plurality of firmware modules including a primary firmware module stored at a first range of addresses and a backup firmware module stored at a second range of addresses;
    a processor configured to boot an operating system on the apparatus with the primary firmware module, wherein the operating system is configured to access one or more of the plurality of firmware modules by sending a message to the memory, the message comprising a command and an address in the memory; and
    a firmware protection module configured to:
        intercept the message from the operating system;
        responsive to a determination that the address is within the second range of addresses and that the command is prohibited for the second range of addresses storing the backup firmware module, prevent at least a portion of the message from reaching the memory; and
        responsive to a determination that the address in the message is within the first range of addresses storing the primary firmware module, allow the message to reach the memory while the apparatus is running the operating system.

9. The apparatus of claim 8, wherein the firmware protection module is configured to prevent at least a portion of the message from reaching the memory by interrupting an address line between the processor and the memory, so as to prevent the address corresponding to the backup firmware module from reaching the memory.

10. The apparatus of claim 8, wherein the message is a Serial Peripheral Interface (SPI) frame, and wherein the firmware protection module is configured to prevent at least a portion of the message from reaching the memory by interrupting a SPI Chip Select line of a SPI bus between the processor and the memory.

11. The apparatus of claim 8, wherein the processor is further configured to:
upgrade the backup firmware module based on a validated upgrade capsule.

12. The apparatus of claim 8, wherein the processor is configured to boot the operating system from one or more code modules in the primary firmware module.

13. The apparatus of claim 12, wherein the processor is further configured to:
update the primary firmware module to generate an updated primary firmware module; and
reboot the operating system from the updated primary firmware module.

14. The apparatus of claim 13, wherein the processor is further configured to, responsive to a determination that the updated primary firmware module corrupted the operating system, reboot the operating system from the backup firmware module.

15. An apparatus comprising:
a first memory configured to store a primary firmware module;
a second memory configured to store a backup firmware module;
a processor configured to boot an operating system by selectively accessing the primary firmware module or the backup firmware module;
a communications bus configured to communicatively couple the processor to the first memory and the second memory; and
a firmware protection module configured to:
intercept a message from the operating system, the message comprising a command and an indicator of a selected memory between the first memory and the second memory for booting the operating system;
responsive to a determination that the selected memory is the second memory configured to store the backup firmware module, interrupt the indicator to prevent the message from reaching the selected memory; and
responsive to a determination that the selected memory is the first memory configured to store the primary firmware module, allow the message to reach the first memory while the operating system is running.

16. The apparatus of claim 15, wherein the communications bus is a Serial Peripheral Interface (SPI) bus, and wherein the firmware protection module is configured to prevent the message from reaching the selected memory by interrupting a SPI Chip Select line of the SPI bus.

17. The apparatus of claim 15, wherein the processor is further configured to upgrade the backup firmware module based on a validated upgrade capsule.

18. The apparatus of claim 15, wherein the processor is configured to boot the operating system from the primary firmware module in the first memory.

19. The apparatus of claim 18, wherein the processor is further configured to:
update the primary firmware module to generate an updated primary firmware module; and
reboot the operating system from the updated primary firmware module.

20. The apparatus of claim 19, wherein the processor is further configured to, responsive to a determination that the updated primary firmware module corrupted the operating system, reboot the operating system from the backup firmware module stored in the second memory.

* * * * *